July 8, 1924.
J. F. O'CONNOR
1,500,147
FRICTION SHOCK ABSORBING MECHANISM
Filed July 19, 1922    2 Sheets-Sheet 2
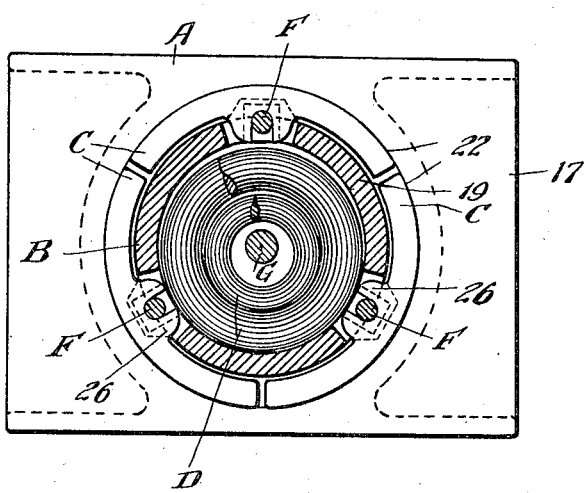
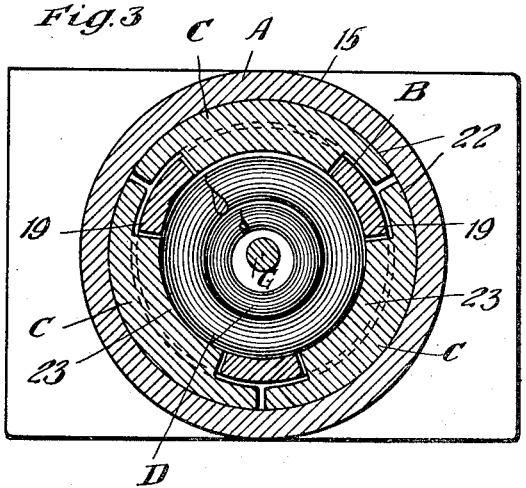
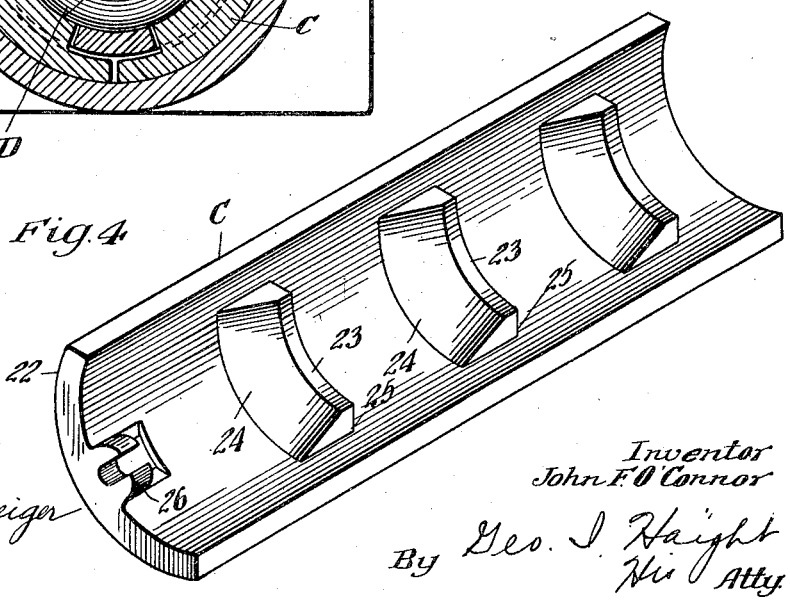
Witnesses
Wm. Geiger
Inventor
John F. O'Connor
By Geo. I. Haight
His Atty.

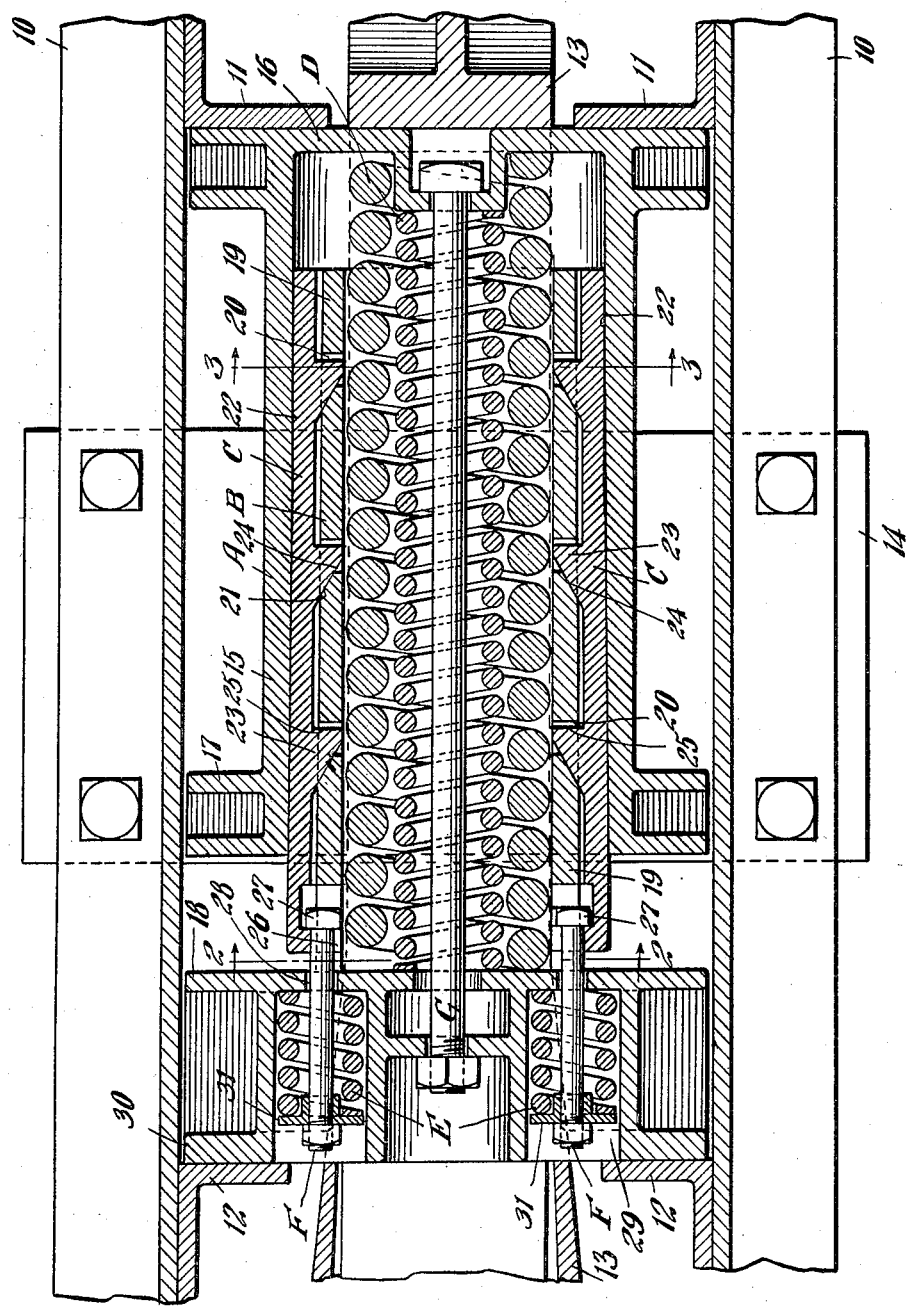

Patented July 8, 1924.

1,500,147

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed July 19, 1922. Serial No. 575,962.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

One object of the invention is to provide a friction shock absorbing mechanism especially adapted for railway draft rigging wherein are empolyed large friction wearing areas to develop high frictional capacity with a relatively low pressure per unit of area.

Another object of the invention is to provide a friction mechanism of the character described, wherein are employed telescoped casings with interposed elongated friction shoes so that the parts are enclosed and weather protected.

Other objects of the invention will more clearly appear from the description and claims hereinafter following.

In the drawings forming a part of this specification, Figure 1 is a horizontal longitudinal sectional view of a portion of a railway draft rigging showing my improvements in connection therewith. Figures 2 and 3 are vertical transverse sectional views of the shock absorbing mechanism proper and corresponding to the section lines 2—2 and 3—3 respectively of Figure 1. And Figure 4 is a detail perspective of one of the friction shoes.

In said drawings, 10—10 denote channel draft sills of a railway car to the inner faces of which are secured rear stop lugs 11 and front stop lugs 12. The shock absorbing mechanism proper is operatively associated with a drawbar, not shown, by means of a hooded cast yoke 13, within which the shock absorbing mechanism is disposed. The yoke and mechanism therewithin are supported in operative position by a detachable saddle plate 14 secured to the draft sills 10.

The shock absorbing mechanism proper, as shown, comprises, broadly, an outer casing A; an inner casing B; a series of elongated friction shoes C; an inner main spring D; a series of individual springs E; a series of connecting bolts F; and a retainer bolt G.

Said outer casing A is of cylindrical form, having a friction shell proper 15 with an integral rear wall 16. Said shell A is open at its forward end, as shown in Figure 1, and is preferably laterally flanged as indicated at 17 to form a suitable limiting stop for the other casing, as hereinafter explained.

The inner casing B is formed with a transversely extending wall 18 and extended from the inner face of the latter is a cylindrical section proper 19. The cylindrical section 19 is provided with laterally extended openings or recesses 20—20 spaced at intervals longitudinally thereof and adjacent each opening 20, the exterior surface is made wedge-shaped or beveled to provide a wedge surface as indicated at 21. Said inner casing B is open at its inner end, that is, the end adjacent the integral wall 16 of the outer casing A and it will be noted that the walls 18 and 16 of the inner casing B and outer casing A, respectively, provide abutments for the ends of the two-coil main spring D, as shown in Figure 1.

The friction shoes are also preferably three in number, each extending through an arc of approximately 120°, as shown in Figures 2 and 3. Each shoe C is formed on the exterior thereof with an arcuate friction surface 22 cooperable with the interior friction surface of the shell proper 15 of the outer casing A. Along its inner face, each shoe C is provided with a series of longitudinally spaced inwardly extending wedge-shaped flanges 23—23, each having a wedge surface 24 cooperable with a wedge surface 21 of the inner casing. The flanges 23 are made of such length, as best shown in Figure 1, as to normally leave an appreciable clearance between the flat shoulder 25 thereof and the opposed edge of the corresponding opening 20. It will be noted also that there is a clearance left between the inner faces of the shoes C and the outer faces of the inner casing 19. The shoes C are made of approximately the same length as the inner casing B and are adapted to slide within the outer casing A when the two casings A and B are telescoped farther together.

At its outer end, each shoe C is formed with an inwardly extended recessed anchoring flange 26 for the head 27 of a bolt F. The shank of each bolt F is extended through a suitable opening 28 in the wall 18 within a socket 29 provided in a relatively thick or deep follower 30 formed integrally with the inner casing B on the outer side of the wall 18 thereof. Each bolt F carries a washer or small spring follower 31 between which and the bottom of the socket 29 is interposed one of the springs E, as shown in Figure 1. In this manner, it will be evident that the springs E, which are placed under an initial compression, automatically tend to pull the shoes C toward the wall 18 of the inner casing and thus always maintain the wedge surfaces 21 and 24 in contact and also automatically compensate for any wear which may occur on the various surfaces.

The retainer bolt G is anchored at one end within a hollow boss provided in the abutment or wall 16 of the outer casing A and, at its other end, within a suitable socket provided in the follower 30.

In operation, during a compression stroke, as the front follower which is integral with the inner casing B, is moved rearwardly, the inner casing B travels inwardly, thus forcing the friction shoes C therewith and gradually augmenting wedging action against the shoes and forcing the latter into tighter and tighter frictional engagement with the outer casing A. Upon removal of the actuating force, the main spring D will expand, thus forcing the two casings A and B apart and the shoes C will be drawn outwardly with the casing B through the intermediary of the bolts F and springs E. It will be noted that a spring column is provided for absorbing the ultimate blow, inasmuch as the follower 30 will engage with the outer end of the casing A. By reason of the telescoped arrangement of the casings A and B and the interposed friction shoes C, I am enabled to obtain an unusually large amount of frictional wearing area so that, for a predetermined capacity, the pressure per unit of area may be kept relatively small, thus minimizing tendency to score or gouge the metal and prolonging the life of the mechanism.

I have herein shown and described what I now consider the preferred manner of carrying out the invention, but the same is merely illustrative and I contemplate all such changes and modifications as come within the scope of the claims appended hereto.

I claim:

1. In a draft gear, the combination with an elongated hollow inner casing open at one end and provided with an abutment at the other end; of an elongated hollow outer casing telescopically receiving said inner casing and having an abutment at one of its ends opposite the abutment of said inner casing; elongated shoes interposed between said casings and each provided with a plurality of wedge surfaces disposed at intervals throughout its length, one of said casings having a corresponding plurality of cooperable wedge surfaces; a spring interposed between said abutments of the two casings; and yieldable means, located exteriorly of said inner casing, cooperable with said shoes and the casing having the wedge surfaces to hold the sets of wedge surfaces of the shoes and casing in engagement.

2. In a draft gear, the combination with an elongated hollow inner casing open at one end and provided with an abutment at the other end; of an elongated hollow outer casing telescopically receiving said inner casing and having an abutment at one of its ends opposite the abutment of said inner casing; elongated shoes interposed between said casings and each provided with a plurality of wedge surfaces disposed at intervals throughout its length, one of said casings having a corresponding plurality of cooperable wedge surfaces; a spring interposed between said abutments of the two casings; a series of springs, corresponding in number to the number of shoes, located exteriorly of said inner casing; and means between each spring and corresponding shoe operative to pull the shoe always in tight engagement with the shell having said wedge surfaces.

3. In a draft gear, the combination with an elongated hollow inner casing open at one end and provided with an abutment at the other end, said casing having a plurality of wedge surfaces disposed at intervals throughout its length; of an elongated hollow outer casing telescopically receiving said inner casing; elongated shoes interposed between said casings and each provided with an exterior friction surface cooperable with said outer casing and a plurality of wedge surfaces on the inner side thereof disposed at intervals throughout its length; a spring reacting between said abutment on the inner casing and said outer casing normally tending to separate the casings; and yieldable means, located exteriorly of said inner casing, cooperable with said shoes and the inner casing to automatically hold the wedge surfaces of the shoes and inner casing in engagement.

4. In a draft gear, the combination with an elongated hollow inner casing open at one end and provided with an abutment at the other end, said casing having a plurality of wedge surfaces disposed at intervals throughout its length; of an elongated hollow outer casing telescopically receiving said inner casing; elongated shoes interposed between said casings and each provided with an exterior friction surface cooperable with said outer casing and a plurality of wedge surfaces on the inner side thereof disposed at intervals throughout its length; a spring reacting between said abutment on the inner casing and said outer casing normally tending to separate the casings; a plurality of springs, corresponding in number to the number of shoes, located exteriorly of the inner casing; and means between each spring and corresponding shoe operative to pull the shoe relative to the inner casing to maintain the wedge surfaces in engagement.

5. In a friction shock absorbing mechanism, the combination with an elongated hollow inner casing open at one end and provided with an abutment at the other end; of an elongated hollow outer casing telescopically receiving said inner casing; elongated shoes interposed between said casings and each provided with a friction surface cooperable with one casing and with a plurality of wedge surfaces on the opposite side and disposed at intervals throughout its length, the other of said casings having a corresponding plurality of cooperable wedge surfaces; spring means normally tending to separate the two casings; a pocketed follower integral with said casing having the wedge surfaces; spring means seated within the pocketed follower; and connections between said spring means and shoes operative to normally pull said shoes relative to the casing having the wedge surfaces to thereby maintain the sets of wedge surfaces in contact.

6. In a friction shock absorbing mechanism, the combination with an elongated hollow inner casing open at one end and provided with an abutment at the other end, said casing having also a pocketed follower exteriorly of said abutment, said casing having also a series of wedge surfaces disposed at intervals throughout its length; of an elongated hollow outer casing telescopically receiving said inner casing; elongated shoes interposed between said casings and each provided with an outer friction surface cooperable with the outer casing and with a plurality of wedge surfaces on the inner side thereof disposed at intervals throughout its length and cooperable with said wedge surfaces of the inner casing; spring means reacting between said two casings normally tending to separate the same; spring means seated within said pocketed follower; and connections between said spring means and the friction shoes operative to maintain the wedge surfaces of the shoes in engagement with the wedge surfaces of the inner casing.

7. In a friction shock absorbing mechanism, the combination with a follower having a plurality of pockets therein, said follower being provided on the opposite side with an elongated casing; of an outer casing telescopically receiving said inner casing; a plurality of elongated friction shoes interposed between said two casings, each shoe having on the exterior thereof a friction surface cooperable with the outer casing and provided on the inner side thereof with a plurality of longitudinally separated wedge surfaces, said inner casing having cooperable longitudinally separated wedge surfaces; spring means reacting between said outer casing and said follower arranged to yieldingly resist relative approach of said casings; a spring in each of said pockets; and a bolt extending between each spring and each shoe whereby the shoes are maintained with their wedge surfaces in contact with the wedge surfaces of the inner casing.

8. In a friction shock absorbing mechanism, the combination with elongated telescoped inner and outer members, said outer member being provided with interior friction surfaces, and the inner member being provided with wedge surfaces; of elongated friction shoes interposed between said telescoped members, each shoe having a friction surface on its outer side and wedge surfaces on its inner side; a main spring resistance operative between said two members to yieldingly resist relative approach thereof; and additional spring means, associated with said shoes and inner member, tending to force said shoes and inner member in opposite directions.

In witness that I claim the foregoing I have hereunto subscribed my name this 30th day of June, 1922.

JOHN F. O'CONNOR.

Witnesses:
 UNA C. GRIGSBY,
 ANN BAKER.